United States Patent
Deubel et al.

(10) Patent No.: US 8,732,174 B2
(45) Date of Patent: May 20, 2014

(54) SEARCHING FOR DATA OBJECTS

(75) Inventors: Christian Deubel, Ludwigshafen (DE); Gertrude Guth, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/358,328

(22) Filed: Jan. 25, 2012

(65) Prior Publication Data

US 2012/0124055 A1 May 17, 2012

Related U.S. Application Data

(63) Continuation of application No. 11/111,508, filed on Apr. 21, 2005, now abandoned.

(30) Foreign Application Priority Data

Aug. 6, 2004 (DE) .......................... 10 2004 038 544

(51) Int. Cl.
  *G06F 17/30* (2006.01)
(52) U.S. Cl.
  CPC .... *G06F 17/30321* (2013.01); *G06F 17/30017* (2013.01); *G06F 17/30911* (2013.01); *G06F 17/30864* (2013.01)
  USPC ........... 707/741; 707/759; 707/830; 707/673; 707/696; 707/711; 707/722; 707/769; 709/201; 709/203; 709/213; 709/217
(58) Field of Classification Search
  CPC ................... G06F 17/30011; G06F 17/30017; G06F 17/3002; G06F 17/30023; G06F 17/30864; G06F 17/30321; G06F 17/30911
  USPC ......... 707/741, 842, 830, 673, 696, 711, 739, 707/722, 769; 709/201, 203, 213, 217
  See application file for complete search history.

(56) References Cited

U.S. PATENT DOCUMENTS

| 5,708,806 A * | 1/1998 | DeRose et al. ......................... 1/1 |
| 6,654,734 B1 * | 11/2003 | Mani et al. ............................ 1/1 |

(Continued)

FOREIGN PATENT DOCUMENTS

WO WO-0217123 A2 2/2002

OTHER PUBLICATIONS

"U.S. Appl. No. 11/111,508, Advisory Action mailed Nov. 18, 2008", 3 pgs.

(Continued)

*Primary Examiner* — Frantz Coby
(74) *Attorney, Agent, or Firm* — Schwegman, Lundberg & Woessner, P.A.

(57) ABSTRACT

Method and system to search for data objects are provided. The method comprises generating an attribute index and a content index. The attribute index comprises entries associated with respective access control information for a set of data objects and generating. The content index comprises words from the set of data objects. A search query directed at the set of data objects is processed by searching the content index, searching the attribute index, and obtaining a search result based on the results of searching of the content index and the attribute index.

20 Claims, 12 Drawing Sheets

(56) References Cited

U.S. PATENT DOCUMENTS

| | | | |
|---|---|---|---|
| 6,704,747 | B1 | 3/2004 | Fong |
| 7,007,034 | B1 * | 2/2006 | Hartman et al. ............ 707/812 |
| 7,062,563 | B1 | 6/2006 | Lewis et al. |
| 7,296,011 | B2 * | 11/2007 | Chaudhuri et al. ................... 1/1 |
| 7,372,795 | B2 * | 5/2008 | Yoshida et al. ............ 369/53.21 |
| 7,546,284 | B1 * | 6/2009 | Martinez et al. ....................... 1/1 |
| 7,689,544 | B2 * | 3/2010 | Koenig .......................... 707/741 |
| 2001/0027451 | A1 * | 10/2001 | Taguchi et al. .................... 707/3 |
| 2003/0018624 | A1 | 1/2003 | Hsiao et al. |
| 2003/0018632 | A1 | 1/2003 | Bays et al. |
| 2003/0088576 | A1 | 5/2003 | Hattori et al. |
| 2003/0105746 | A1 | 6/2003 | Stickler |
| 2004/0122958 | A1 | 6/2004 | Wardrop |
| 2004/0143569 | A1 | 7/2004 | Gross et al. |
| 2004/0162816 | A1 | 8/2004 | Irle et al. |
| 2004/0215616 | A1 * | 10/2004 | Ogawa et al. ....................... 707/9 |
| 2004/0252605 | A1 * | 12/2004 | Yoshida et al. ............ 369/47.22 |
| 2004/0260694 | A1 * | 12/2004 | Chaudhuri et al. ................ 707/5 |
| 2005/0050023 | A1 | 3/2005 | Gosse et al. |
| 2005/0076024 | A1 | 4/2005 | Takatsuka et al. |
| 2005/0114319 | A1 * | 5/2005 | Brent et al. ........................ 707/3 |
| 2005/0256865 | A1 | 11/2005 | Ma et al. |
| 2006/0031206 | A1 | 2/2006 | Deubel et al. |
| 2006/0095345 | A1 * | 5/2006 | Ka et al. ........................ 705/27 |
| 2013/0086277 | A1 * | 4/2013 | Sumler et al. ................ 709/231 |

OTHER PUBLICATIONS

"U.S. Appl. No. 11/111,508, Appeal Brief filed Dec. 30, 2008", 23 pgs.

"U.S. Appl. No. 11/111,508, Examiner's Answer to Appeal Brief mailed Apr. 15, 2009", 19 pgs.

"U.S. Appl. No. 11/111,508, Final Office Action mailed Aug. 5, 2008", 16 pgs.

"U.S. Appl. No. 11/111,508, Non Final Office Action mailed Jul. 2, 2007", 10 pgs.

"U.S. Appl. No. 11/111,508, Non-Final Office Action mailed Jan. 8, 2008", 13 pgs.

"U.S. Appl. No. 11/111,508, Reply Brief filed Jun. 4, 2009", 7 pgs.

"U.S. Appl. No. 11/111,508, Response filed Apr. 3, 2008 to Non-Final Office Action mailed Jan. 8, 2008", 11 pgs.

"U.S. Appl. No. 11/111,508, Response filed Oct. 9, 2007 to Non-Final Office Action mailed Jul. 2, 2007", 10 pgs.

"U.S. Appl. No. 11/111,508, Response filed Nov. 4, 2008 to Final Office Action mailed Aug. 5, 2008", 11 pgs.

"European Application Serial No. 05008735.2, Office Action mailed Mar. 17, 2011", 4 pgs.

Sacks, Davis, et al., "Indexing Documents for queries on Structure, Content and Attributes", Proceedings of the International Symposium on Digital Media Information Base, Nara, Japan (Nov. 26, 1997), 236-245.

* cited by examiner

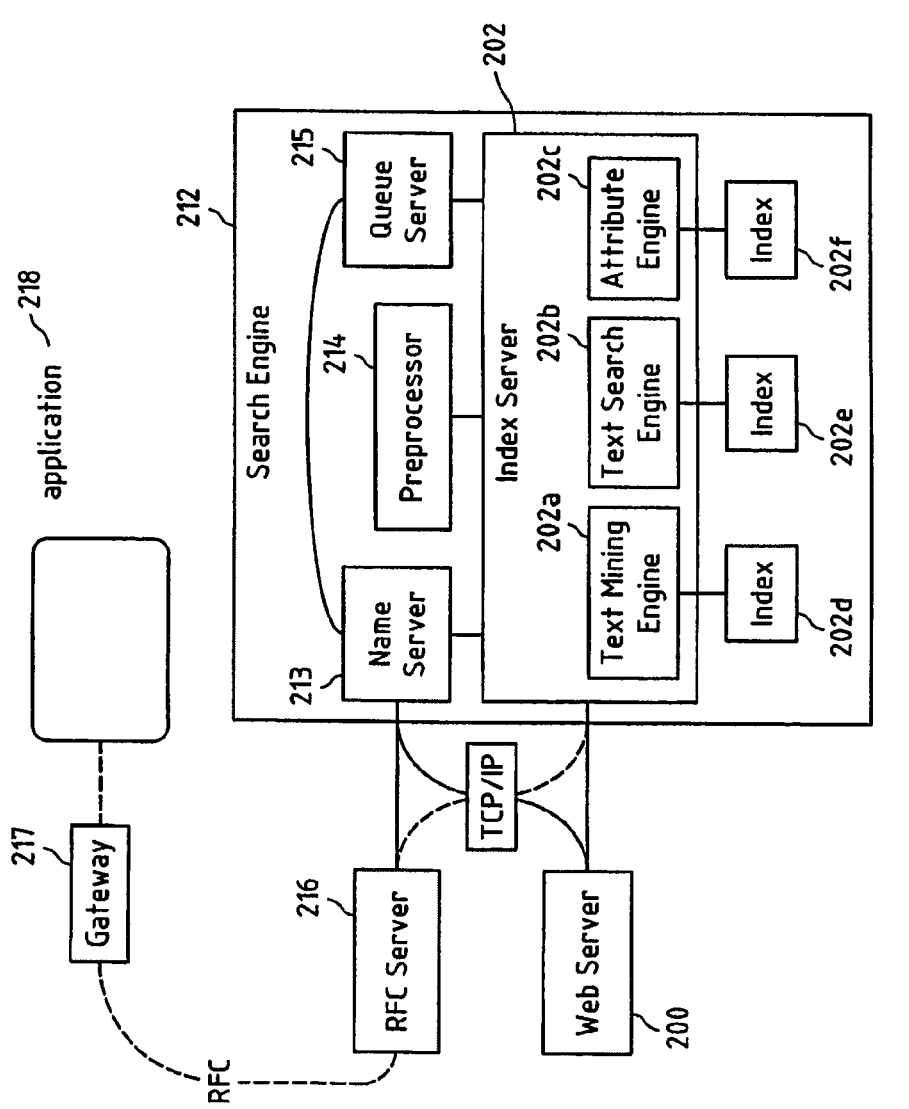

| Query for Search Engine | | | | | |
|---|---|---|---|---|---|
| Query | = | [Statement] = "ABC" | AND | { [USER] = "current user" | OR |
| | | | | [GROUP] = "current group" | |
| | | | | [ROLE] = "current role" | } |

500 ↗     502 ↗ Search Statement     504 ↗ User Access Data

Fig.5

Fig.10b mySAP PLM
cFolders

Home
 deu test2
 private
  root

Collaboration on the Web

Favorites  Settings  Help  Logout
                                  Help — 1003

Search result

Navigation: Folder
Current Path: deu test2 > private > root > Search result

[Search result]

Search query: "sap" AND [created by] = "Christian Deubel"

[New Search]

Overview of Search results
– Select a name of a search result to browse to the document.

Number of search results: 1

| Name | Description | Found in |
|---|---|---|
| SAP Market place | Market place | (Metadata) File content (...) |

1006    1008

SEARCHING FOR DATA OBJECTS

CLAIM TO PRIORITY

This application is a continuation of U.S. application Ser. No. 11/111,508 filed on Apr. 21, 2005 now abandoned entitled, "Searching for Data Objects," and to German Patent Application No. DE102004038544.0, filed on Aug. 6, 2004, the contents of which are hereby incorporated by reference into this patent application as if set forth herein in full.

TECHNICAL FIELD

This patent application relates generally to searching for data objects.

BACKGROUND

Enterprise solutions use data objects to represent real world items and other information. For example, data objects can be used to store content including, but not limited to, text, images, graphics, video, and/or multimedia. A business object is a special type of data object that can be used to represent information related to a business including, but not limited to, folders, documents, bookmarks, materials, material lists, item lists, data sheets, presentations, and text documents.

Data objects can be used to support collaborations, competitions, or official tenders. For example, a public tender can be implemented using a public folder, in which each bidding party can have a reserved area with folders. Inside these folders, bidding parties can read tender documents for particular items, store their bids, and store additional data and communications between parties. Since the data objects are stored centrally, access rights to the data objects need to be managed. For example, it should be possible to prohibit certain users from accessing all data objects. That is, two bidding parties should not be able to access each others' bidding or communication objects.

Data objects also store metadata. Metadata is data that not directly related to object content. Metadata can include object attributes, such as object identifiers, object names, time stamps, access control attributes, object locations, times of object creation, creator names, object change times, identities of users making changes, and the like. Access control attributes may specify who has access to a particular data object.

In more detail, the access control attributes can specify the identity of a user, a group of users, and/or users having a particular role, who have access to data objects. The access control attributes can also include access right information. Access right information specifies an extent of access. For example, certain users may be permitted only to read a data object, whereas other users may be permitted both to read and to edit the data object.

Search engines may be used to search databases, including databases that contain data objects. One disadvantage of conventional search engines is that they do not take user access rights into account when returning search results.

DESCRIPTION OF THE DRAWINGS

FIG. 2*b* is a block diagram of search engine that may be incorporated into the system of FIG. 2*a*.

FIG. 5 is a diagram of a search query used in the process of FIG. 3.

FIG. 10*b* is a screenshot of search results that may be produced by the search engine of FIG. 2*b*.

Like reference numerals in different figures denote like elements.

DETAILED DESCRIPTION

Figure 2A:
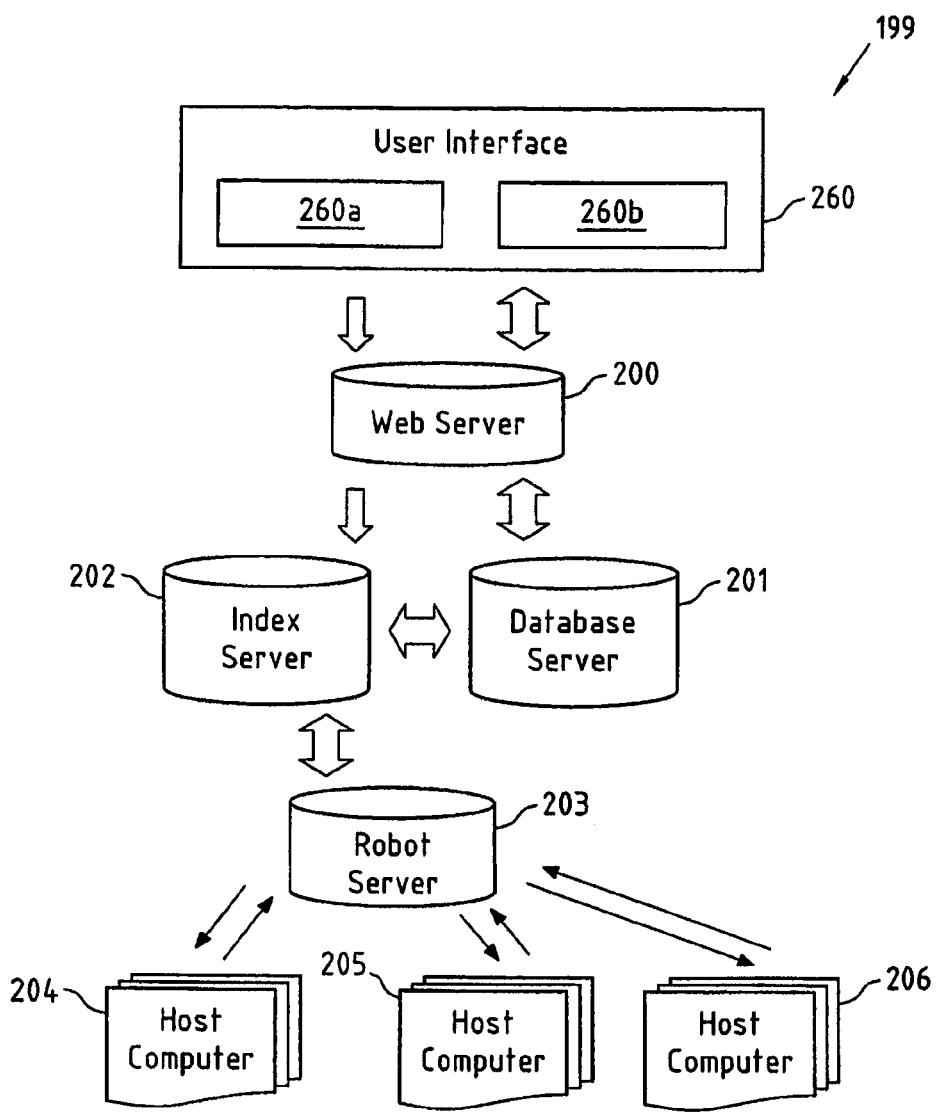
FIG. 2*a* is a block diagram of a system that may be used to search for data objects.
Figure 10A:
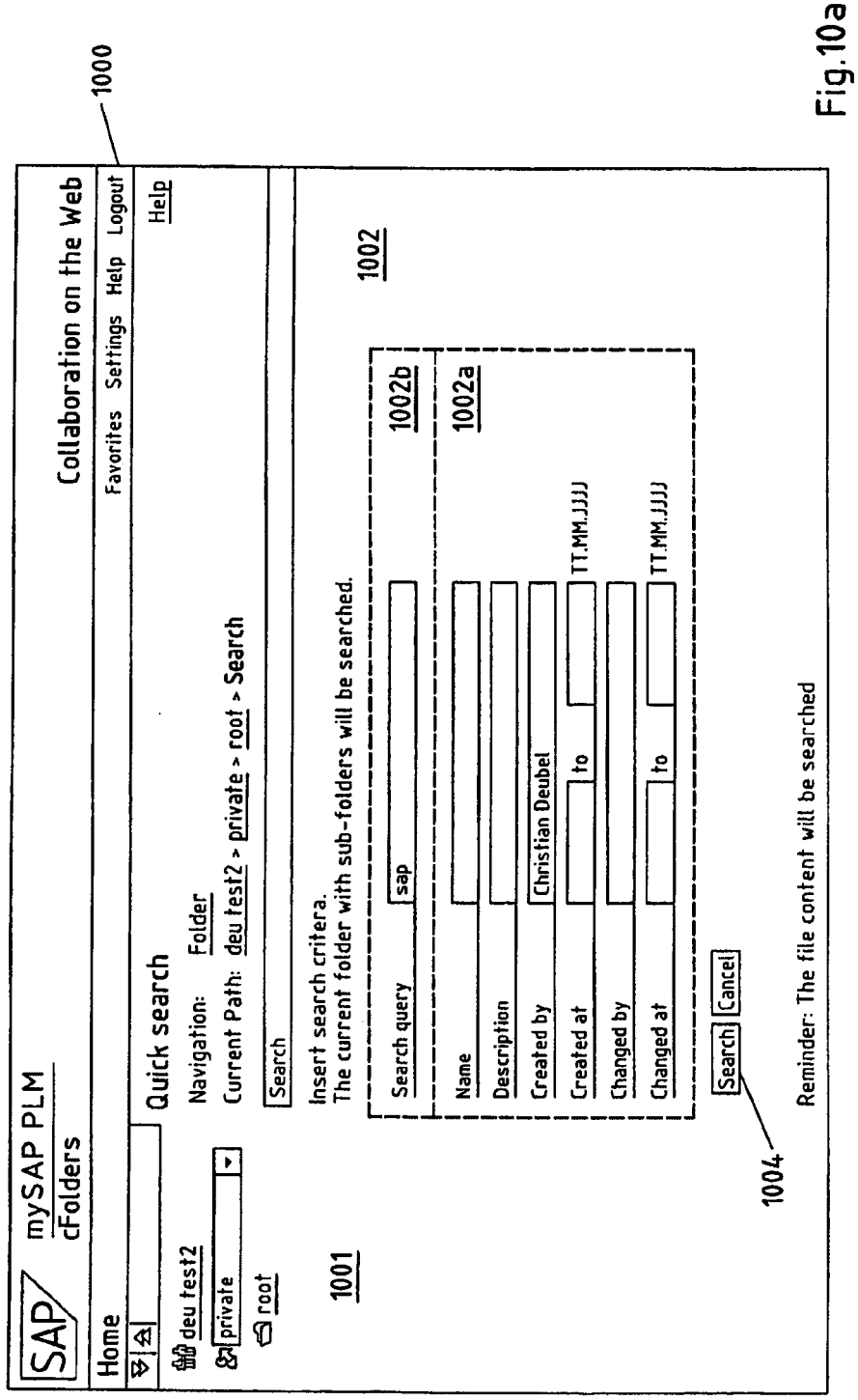
FIG. 10*a* is a screenshot of a user interface that may be generated by the search engine of FIG. 2*b*.

FIG. 2 shows a computer system 199, on which the processes described herein may be implemented. Computer system 199 includes a Web server 200 and a user interface 260. Web server 200 generates user interface 260. In this example, user interface 260 includes a registration page 260*a* and a search page 260*b*. An example of search page 260*b* is shown in FIG. 10*a* (described below). Computer system 199 also a database server 201, an index server 202, and a robot server 203.

Registration page 260*a* can be used to register Web sites with the Web server 200. In this example, Web server 200 operates as middleware between registration page 206*a* and database server 201. Once a Web site is registered, its address, in this case its uniform resource locator (URL), is entered into index server 202. It is noted that index server can reject certain registrations. For example, index server 202 can include functionality to block URLs of Web sites, such as "spam sites", from being indexed.

URLs in index server 202 are processed by robot server 203. Robot server 203 generates robot programs for searching corresponding Web sites hosted by host computers 204, 205, 206. These robot programs analyze the content and attributes of data objects in the Web sites, and provide the results of their analyses to index server 202. Index server 202 uses these results to index content and the attributes of the data objects.

To search, a user enters a search query on search page 260*b*. The search query is sent to index server 202, where the search query is processed. Data objects that meet one or more criteria of the search query are located, information relating to the objects retrieved, and search results containing this information are presented to the user. Database server 201 can be used to present page 260*b* and search results to the user.

Index server 202 is used in connection with a search engine 212 that may be implemented using system 199 or portions thereof, as shown in FIG. 2*b*. In this example, search engine 212 includes, among other things, a name server 213, a preprocessor 214, a queue server 215, and index server 202.

Index server 202 includes a text mining engine 202a and corresponding index 202d, a text search engine 202b and corresponding index 202e, and an attribute engine 202c and corresponding index 202f. Indices 202d and 202e can be content indexes, which enable full-text searches of content of data objects. Index 202f can be an attribute index, which indexes attributes, rather than content, of data objects. As a result, index 202f enables searches for data objects based on their attributes, rather than their content.

Figure 4:
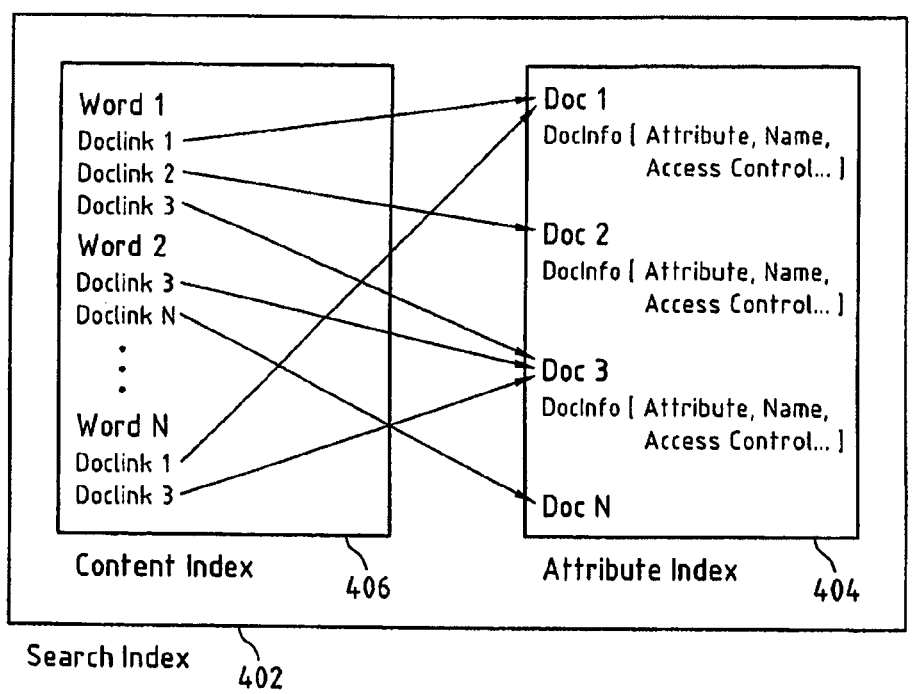
FIG. 4 is a diagram showing indexing of documents and their attributes.

FIG. 4 shows one way of indexing documents that can be used with the processes described herein. In particular, FIG. 4 shows a search index 402, which includes an attribute index 404 and a content index 406. Content index 406 includes a dictionary of all words in one or more documents. Search index 402 provides, for each word in content index 406, a link to corresponding document information in attribute index 404. To illustrate, in FIG. 4, "Word1" is used in "Doc1", "Doc2", and "Doc3". As such, content index 406 includes a list of document links, "Doclink 1", "Doclink2", and "Doclink3", which provide links to corresponding documents "Doc1", "Doc2", and "Doc3" in attribute index 404. Each document in attribute index 404 includes information, "DocInfo", about the document. DocInfo may include one or more pointers to corresponding document(s) in memory.

Attribute index 404 stores information about each document, as opposed to document content. This information can be stored as metadata and may include, e.g., attributes of the document, a name of the document, and access control attributes associated with the document. The attributes can include object identifiers (IDs), collaboration IDs, topic IDs, folder IDs, and area IDs. The access control attributes can include a user name, a user group, and/or a user role in combination with an access right for a corresponding data object. The access right can specify an ability to access the document, such whether to provide a user or group with read and/or write or full access to a particular document.

Referring back to FIG. 2b, search engine 212 is accessible to Web server 200 and to other applications, such as application 218. To provide access to applications other than Web server 200, search engine 212 incorporates a front-end remote function call (RFC) server 216. Applications 218 can access search engine 212 by way of remote function calls generated, e.g., by a gateway 217 associated with application 218.

Figure 3:
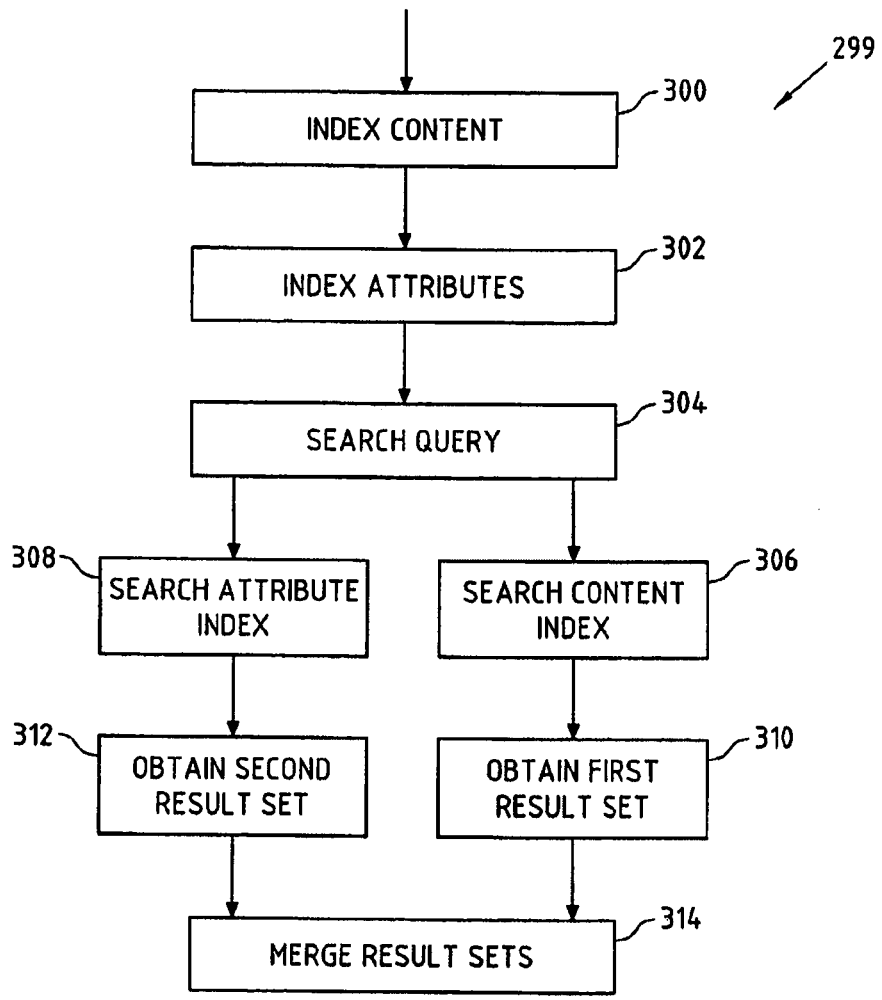
FIG. 3 is a flowchart showing a process for searching for data objects using the search engine of FIG. 2*b* and the system of FIG. 2*a*.
Figure 7:
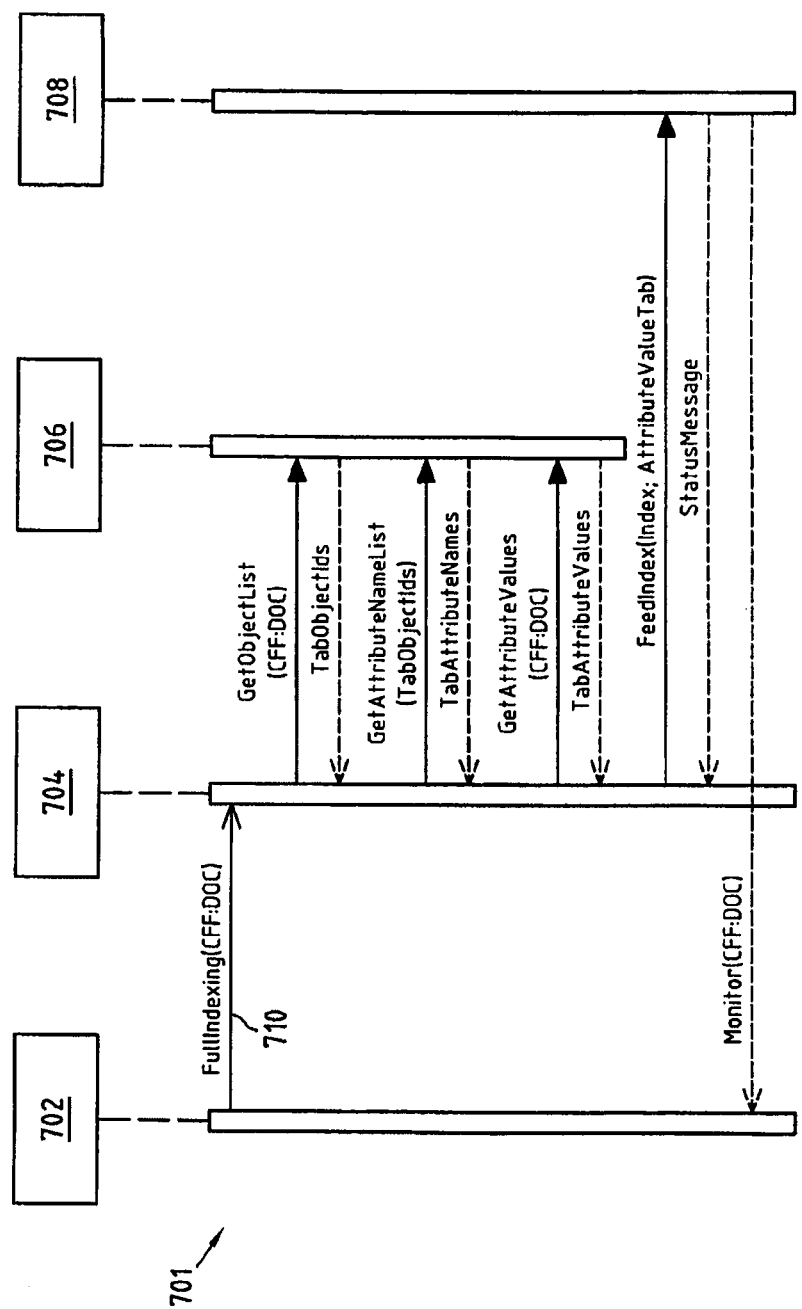
FIG. 7 is a unified modeling language (UML) sequence chart showing a process for indexing data objects and/or attributes of data objects.
Figure 8:
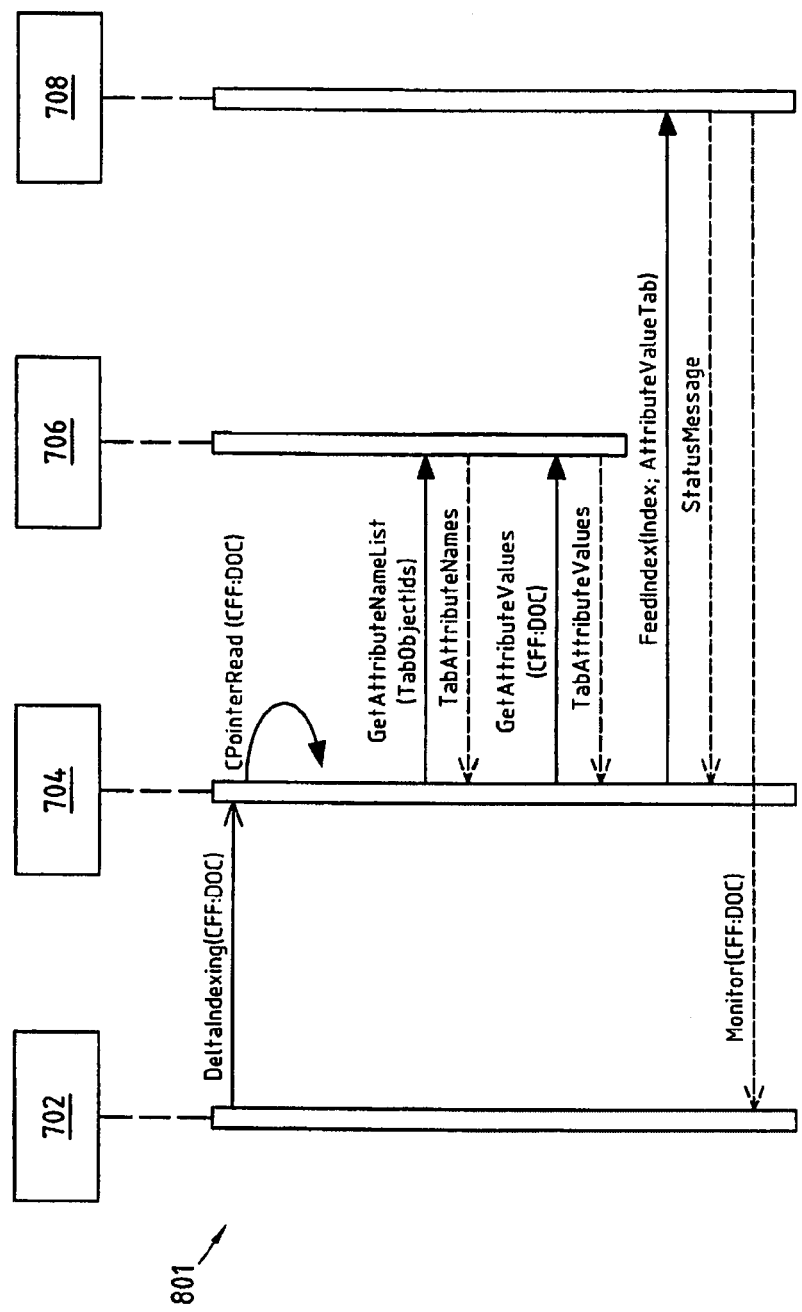
FIG. 8 is a UML sequence chart showing a process for indexing only changes to data objects and/or attributes of data objects.

FIG. 3 shows a process 299 for executing searches using search engine 212 of FIG. 2b. Process 299 includes generating (300) one or more content indices for data objects, and generating (302) one or more attribute indices for the data objects. FIGS. 7 and 8 (described below) show examples of processes for generating the indices used in process 299.

Search engine 212 receives (304) a search query. An example of a search query 500 is shown in FIG. 5. Referring to FIG. 5, search query 500 includes a search statement 502 and user access data 504. Search statement 502 can be a string of characters, which correspond to content of data objects to be searched. Search statement 502 can also be a string of characters that correspond to attributes of the data objects to be searched.

Search query 500 also includes user access data 504. User access data 504 can include data that identifies the user who generated the search query. For example, user access data 504 can identify the "current user", a "current group" that the user is in, and/or a "current role" of the user in that group. In this regard, the user can participate in several groups and can have several roles, each of which can be reflected in search query 500.

After receiving the search query, process 299 searches (306) content index 406 for data objects that correspond to parameters of search statement 502. Searching for data objects within content index 406 includes searching for data objects with elements of content that at least partially meet (e.g., match, or are similar to) parameters of the search statement. All data objects that are obtained (310) by searching content index 406 constitute a first search result set. The first search result set can include the data objects themselves, IDs or other indicia associated with the data objects, or links or pointers to the data objects. The links or pointers can be references to storage locations of the data objects. Fuzzy logic may be used to perform the search. Such a search may identify data objects with elements of data that are similar, in some way, to parameters of the search query (as opposed to matching the parameters of the search query exactly).

In addition to searching content index 406, process 299 searches (308) attribute index 404 for data objects that correspond to user access data 504. That is, process 299 searches for data objects with access control attributes that correspond to access control attributes for the user, which correspond to user access data 504.

Search engine 212 can search for data objects with access control attributes containing the user's name, the user's groups, and/or the user's roles. Process 299 can also determine whether access right information for the user's name, group, and/or role specifies at least read access, meaning that the user is permitted to read information, but not to write the information. Other levels of access include read and write access, in which a user is allowed both to read and to write to the information, and full access, in which the user is permitted virtually unfettered access to the information. It is possible to require that all user names, groups and/or roles stored in the access control attributes be at least read access before allowing the user access to the corresponding data objects.

Search engine 212 can also search in attribute index 404 for areas, folders, collaborations, and/or other hierarchical objects, which correspond to the user name, the user groups, and/or the user roles, and which grant at least read access to the user.

All data objects that are obtained (312) as a result of searches performed on attribute index 404 constitute a second search result set. This second search result set can identify, e.g., all data objects for which the user has at least read access. The second search result sets can include the data objects themselves, IDs or other indicia associated with the data objects, or links or pointers to the data objects. The links or pointers can be references to storage locations of the data objects. Fuzzy logic may be used to perform the search.

Process 299 merges (314) the first search result set and the second search result set to thereby obtain an overall search result set. This overall search result set is presented to the user as the end-result of the user's query using the search engine. Merging the first and second search result sets can include combining the first search result set with the second search result set. Other methods of merging search results sets may also be used.

Figure 9:
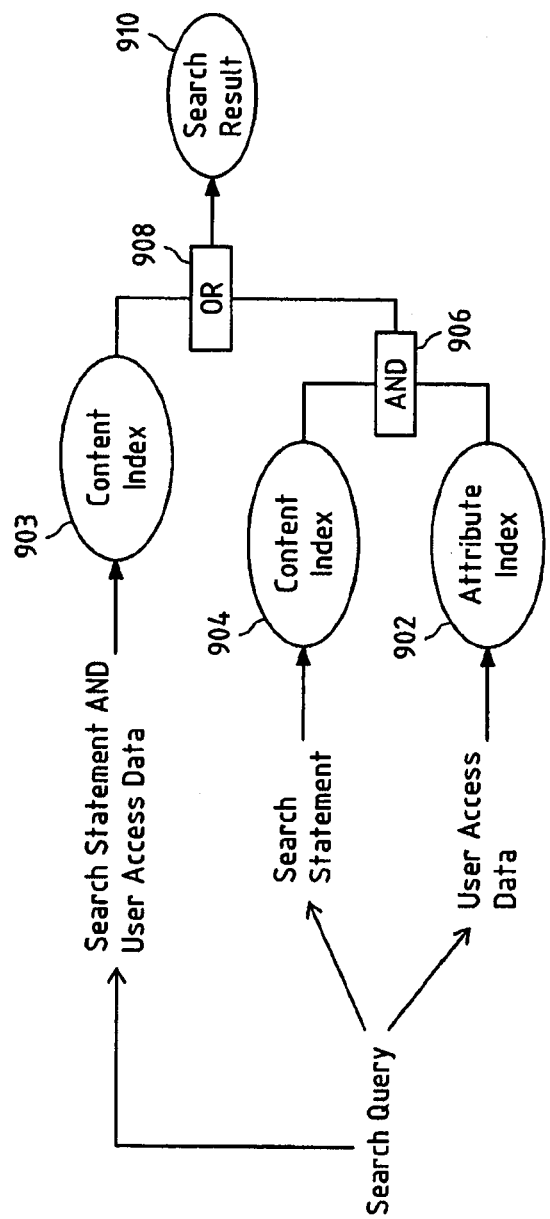
FIG. 9 is block diagram showing ways of combining results of searches conducted according to the process of FIG. 3.

FIG. 9 shows ways of merging search result sets. In particular, FIG. 9 shows merging search results from different indices into an overall search result set. In FIG. 9, content indices 902 and 904 are the same type of index as content index 406, and attribute index 902 is the same type of index as attribute index 404. "AND" 906 indicates a logical AND operation, and "OR" 908 indicates a logical OR operation. These logical operations may be performed on index search results. Thus, the results of searches of context index 904 and of attribute index 902 may be combined using a logical AND, resulting in an overall search result that contains only elements that are common to both searches (e.g., only those data objects that have content with elements of data that meet the search query and that permit read access by the user are provided as search result set 910). This logical AND operation may be used alone to combine search results. Alternatively, the logical AND operation may be augmented with other logical operation(s) (as depicted in FIG. 9).

By way example, a user may want to search for data objects that were created at a particular time. This information can be entered into search engine 212 as a search query. The timing information is stored in the metadata of data objects. Thus, in some cases, it is useful to search the metadata of data objects using the search statement. Results of such a search of a content index 903 can constitute an additional search result set.

In this example, determination of search result set 910 can include using logical OR 908 to merge the additional search result set with the previous search result set produced by logical AND 906. In this example, data objects in search result set 910 will either have elements of data that meet the search query or have elements of data in their metadata that meet the search query. The resulting data objects also permit at least read access to the user.

FIG. 9 shows only some ways of merging search results. Any methods may be used in addition to, or instead of, those above, including, but not limited to, filtering the results and processing the results using one or more computer programs.

As noted above, FIGS. 7 and 8 show examples of processes for generating the indices used in process 299. In this regard, FIG. 7 shows a process 701 for generating an attribute index from a set of data objects. Process 701 may also be used to generate a content index. It is noted that the actors of process 701 may include software modules and/or hardware.

According to process 701, an index may be generated from a predetermined set data objects. To do this, an administration module 702 sends a request, FullIndexing, for a full indexing 710, meaning all objects are to be indexed. A dispatching module 704 processes this request to obtain a message, GetObjectIdList, that is used to retrieve IDs of data objects to be indexed. In this case, all available data objects are to be indexed; however, in other cases, a subset of data objects may be targeted for indexing.

The foregoing GetObjectIdList message is processed by a server 706, which stores the data objects, e.g., business objects for a collaboration folder (cFolders) structure. Server 706 instantiates the data objects to obtain the data objects' IDs. The data objects' metadata is also obtained from the instantiated objects, and stored by server 706.

Server 706 returns, to dispatching module 704, a table, TabObjectsIds, which lists the data objects' IDs. Module 704 uses this table to request, via a GetAttributesNameList message, an attribute name list for the data objects from the server 706. In response, server 706 returns, to dispatching module 704, a table, TabAttributeNames. This table contains names of attributes of the data objects listed in the table.

The attributes' names are used to request attribute values for the named attributes. Module 704 sends a message, GetAttributeValues, to server 706 and, in response, receives a table, TabAttributeValues, of attribute values for the named attributes. The data object IDs, together with their attributes and attribute values, are provided to an index server 708 of a search engine via a FeedIndex message. Index server 708 generates, and stores, the index for the named data objects. Index server 708 reports successful generation of an index to administration module 702 and status information to module 704. It is noted that index server 708 corresponds to index server 202 of FIG. 2a.

The attribute information may include a hierarchical folder structure for data objects. This information enables searching to be limited to a particular area, folder or other hierarchy, within a data structure. Generating the attribute index can also include indexing root information and area information for the data objects. This information can be used to determine a position of a data object within a database.

Foregoing process 701 may be used to index metadata and/or the content (i.e., full-text) of data objects. Because indexing data objects can be time consuming, the data objects can be indexed periodically. Periodic indexing can include indexing only changed values. FIG. 8 illustrates a unified modeling language (UML) sequence chart for such indexing, which is referred to herein as "delta-indexing".

Referring to process 801 of FIG. 8, administration module 702 calls a routine, DeltaIndexing, which performs delta-indexing. Module 704 analyzes a log file to determine object IDs of data object that have changed since a last indexing. The log file may be maintained by a one or more computers used to perform process 801, by one or more computers that store the data objects, by a combination thereof. The list of data object IDs is provided to server 706 in a message, GetAttributeNameList.

In response to GetAttributeNameList, server 706 returns a list, TabAttributesNames, that contains data objects that have changed. The list also identifies attributes of those data objects, and which attributes have changed. Module 704 requests the values of the changed attributes in a message, GetAttributesValues, which identifies data objects for which values are requested. Server 706 responds to GetAttributesValues with a table of attribute values, TabAttributesValues, for data objects identified in GetAttributesValues. To obtain values of the attributes, instances of the data objects may be created and metadata therefor may be read.

The attribute values contain access control attributes, which can be used in search engine 212 to support searches using access control. The obtained attribute values are provided by module 704 to index server 708. Index server 708 updates its index using the values. Index server 708 confirms an index update with appropriate response messages.

Figure 6:
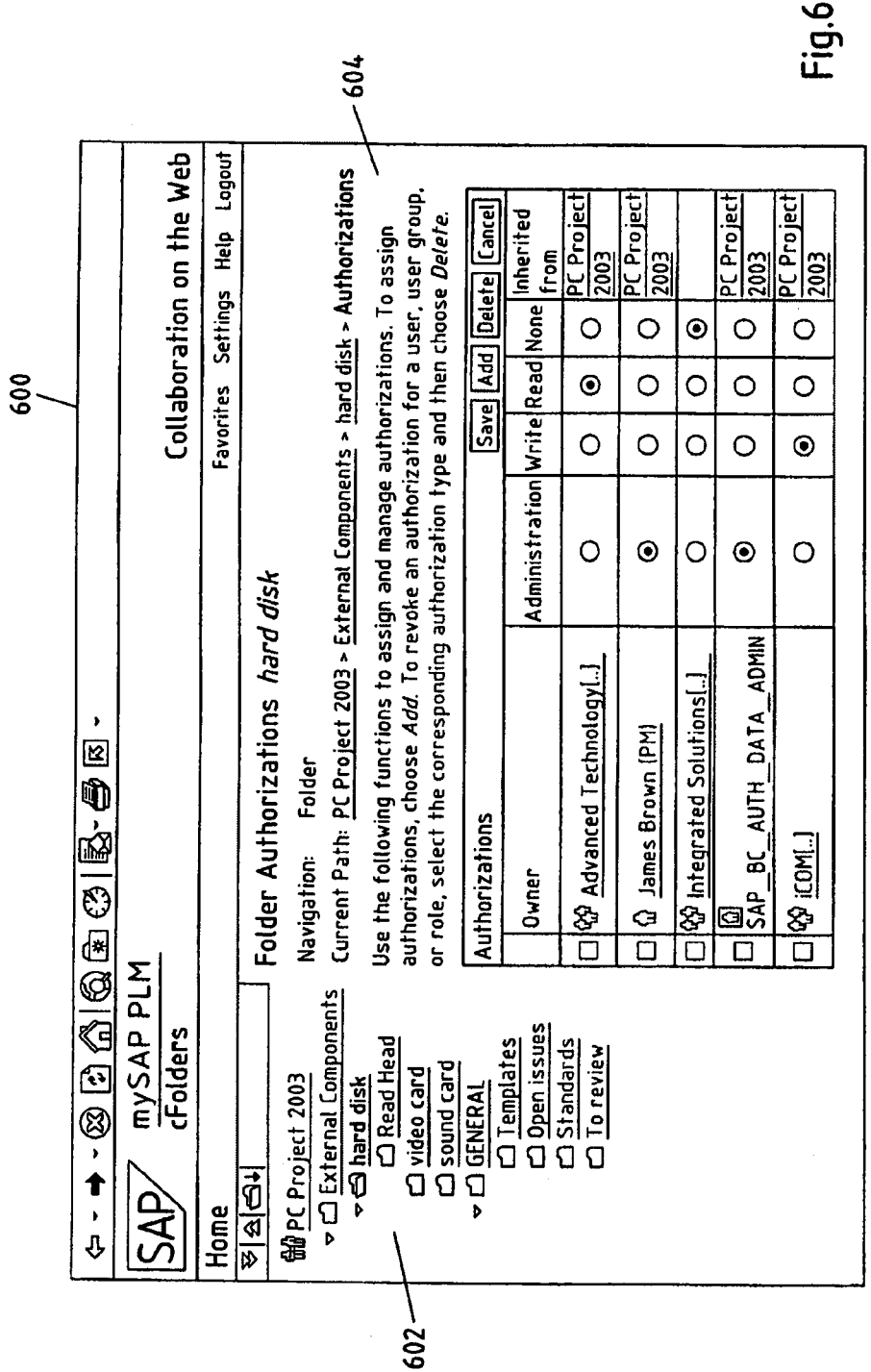
FIG. 6 is a screenshot showing access authorization of folders.

Referring now to FIG. 6, a page is shown that includes access control attributes for a folder having a hierarchical structure. Page 600 includes a frame 602 with hierarchical folder information. The selected folder in this case is "hard disk". For the selected folder, frame 604 shows different access control attributes including a username, a group, or a role, and user access right information. The user access right information can be inherited from parent data object(s), or it can be defined independently for each data object. In the example shown in FIG. 6, the user group "Advanced Technology" has read access to the selected folder; the user "James Brown" has administrative access to the selected folder; and the user group "Integrated Solutions" has no access to the selected folder.

FIG. 10a shows a screenshot of a search page 1000, which may be generated by search engine 212 to search a database. In search page 1000, a user can specify a folder to search in field 1001. This folder can be a root folder or any sub-folder. The selection of a folder can be used in generation of an attribute search for that folder. This attribute can be the folder ID for data objects that were identified as a result of a search.

In a field 1002a, a user can specify additional attributes, such as, a name, a description, a date of creation, a name of creator, change data, a name of a user who changed data, or other metadata. The user can also specify, in field 1002b, a search query, which, in this example is "sap". A search button 1004 is provided. Upon selecting search button 1004, search engine 212 is activated to obtain a search result set, which is provided in the page shown in FIG. 12b.

When selecting search button 1004, a search query, including any specified attributes, is provided to search engine 212. In addition, the user who initiated the search request is identified. This can be done by instructing the user to register with system 199 (FIG. 1) upon first use. The identity of the user can also be determined by the user's login name or other identifying indicia. Additionally, at least one user role, or at least one user group is determined. This user access data also provided with the search query.

The search query and associated attributes are processed by search engine 212 in the manner described above in FIG. 3. The search results sets are combined in the manner described above in FIG. 9, and the results are output, e.g., in page 1003 (FIG. 10b).

As shown in FIG. 10b, page 1003 include a frame 1006 that identifies a folder in which the search was conducted. Another frame 1008 presents data objects that turned up during the search. The data objects may be presented with their names, their descriptions, and their original locations. The data objects can be referred to via a link, through which the data objects can be accesses at their corresponding locations.

Figure 1:
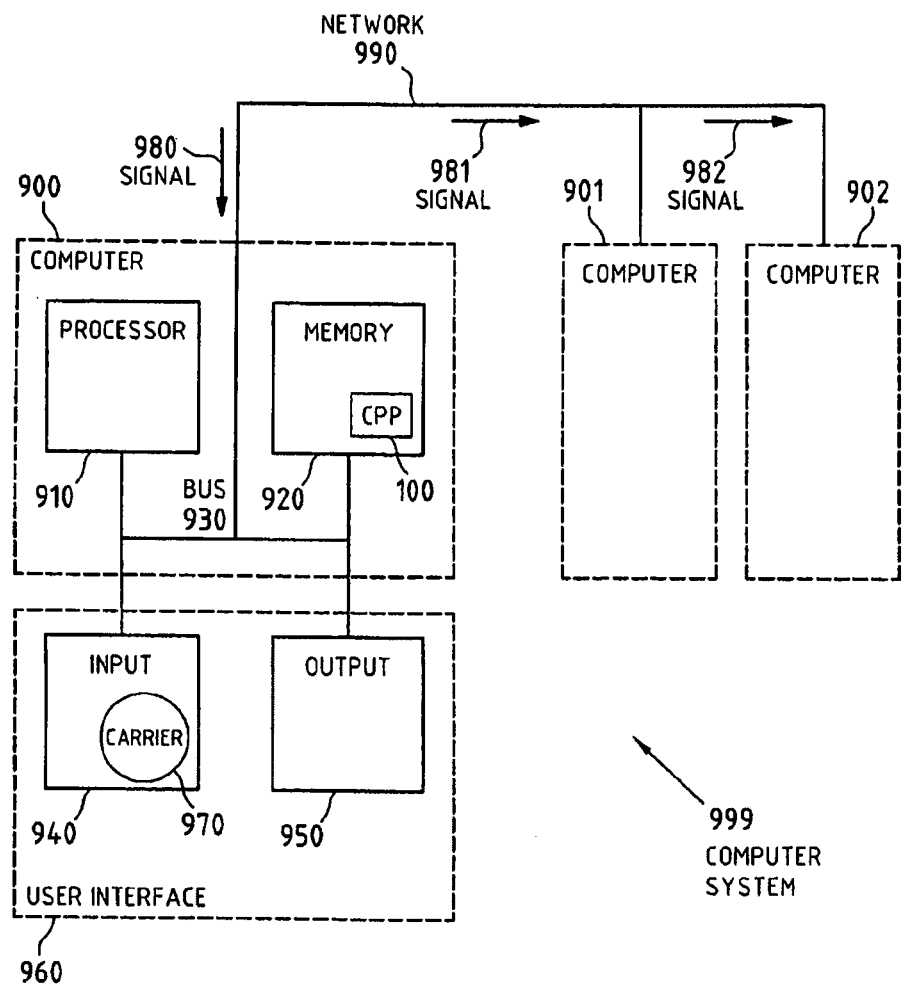
FIG. 1 is a block diagram of a computer system on which the processes described herein may be implemented.

FIG. 1 illustrates a block diagram of an example of computer system 999 on which the processes described herein ("the processes") may be implemented. In this example, computer system 999 includes computers 900, 901, 902. It is noted, however, that the processes can be implemented on any type of processing device(s).

Computer 900 can communicate with computers 901 and 902 over network 990. Computer 900 has processor 910, memory 920, bus 930, and, optionally, input device 940 and output device 950 I/O devices, user interface 960). The processes can be implemented by computer program product 100 (CPP), carrier 970 and/or signal 980.

With respect to computer 900, computer 901, 902 is sometimes referred to as "remote computer", computer 901, 902 may be, for example, a server, a peer device or other common network node, and typically has many or all of the elements described relative to computer 900. Computer 900 is may be a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer, or the like.

Processor 910 may be a CPU, a micro-controller unit (MCU), digital signal processor (DSP), or the like. Memory 920 includes elements that temporarily or permanently store data and instructions. Although memory 920 is illustrated as part of computer 900, memory can also be implemented in network 990, in computers 901, 902 and in processor 910 itself (e.g., cache, register), or elsewhere. Memory 920 can be a read only memory (ROM), a random access memory (RAM), or a memory with other access options. Memory 920 may be implemented by machine-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, and memory stick.

Memory 920 may be distributed. Portions of memory 920 can be removable or nonremovable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text processing tool. Modules are commercially available and can be installed on computer 900. For simplicity, these modules are not illustrated.

CPP 100 includes program instructions and—optionally—data that causes processor 910 to execute method steps of the processes described herein. In other words, CPP 100 can control the operation of computer 900 and its interaction in network system 999 so that is operates to perform in accordance with the processes described herein. For example, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970. Carrier 970 is illustrated outside computer 900. For communicating between CPP 100 and computer 900, carrier 970 is inserted into input device 940. Carrier 970 may be implemented as any machine-readable medium, such as a medium largely explained above (memory 920). Generally, carrier 970 is an article of manufacture having a machine-readable medium with machine-readable program code to cause the computer to perform methods described herein. Further, signal 980 can also embody computer program product 100.

The processes described herein are not limited to use with any particular hardware and software; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the processes can be performed by one or more programmable processors executing one or more computer programs to perform the functions of the processes. The method steps can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with the processes can be rearranged and/or one or more such steps can be omitted to achieve the same, or similar, results to those described herein.

The data objects described herein may be used to store content, which can include, but is not limited to, text, images, graphics, video or other multimedia content.

Elements of different embodiments described herein may be combined to form other embodiments not specifically set forth above. Other embodiments not specifically described herein are also within the scope of the following claims.

What is claimed is:

1. A method comprising:
    generating, using at least one processor coupled to a memory, an attribute index for one or more data objects, the attribute index comprising entries associated with respective access control information for each of the one or more data objects;
    generating a content index for the one or more data objects, the content index comprising words from the one or more data objects and one or more document links associated with respective words in the context index, a link from the one or more document links associated with a particular word in the context index, the link providing a reference to an entry in the attribute index, the entry in the attribute index indicating a particular document that includes the particular word and including access control information for the particular document;
    searching, using a search query, a content index to determine a first search results set, the first search result set comprising a first set of data objects from the one or more data objects;
    searching, using access data associated with the search query, an attribute index to determine a second search result set, the second search result set comprising a second set of data objects from the one or more data objects; and
    obtaining a search result based on the first search result set and the second search result set.

2. The method of claim 1, wherein the search result comprises pointers to one or more data objects from the first and/or second set of data objects.

3. The method of claim 1, wherein the obtaining of the search result comprises merging the first search result set and the second search result set.

4. The method of claim 3, wherein the merging of the first search result set and the second search result set comprises identifying data objects having a predetermined relationship to the first search result set and to the second search result set.

5. The method of claim 3, wherein the merging of the first search result set and the second search result set comprises performing a logical AND operation on the first search result set and the second search result set to produce a resultant set.

6. The method of claim 5, further comprising merging the resultant set with an additional search result set.

7. The method of claim 6, wherein merging the resultant set with the additional search result set comprising performing a logical OR operation on the resultant set and the additional search result set.

8. The method of claim 6, wherein the obtaining of the additional search result set comprises searching the attribute index for data objects that have access control attributes that correspond to the user access data and that have metadata that corresponds to the content associated with the search query.

9. The method of claim 1, wherein the access control attributes comprise user access right information.

10. The method of claim 1, wherein the access control attributes comprise at least one of a user name, a user role, a user group name, and at least one user access right.

11. A computer program product tangibly embodied in a non-transitory storage medium, the computer program product comprising instructions that, when executed, cause at least one
    processor to perform operations comprising:
    generating an attribute index for one or more data objects, the attribute index comprising entries associated with respective access control information for each of the one or more data objects;
    generating a content index for the one or more data objects, the content index comprising words from the one or more data objects and one or more document links associated with respective words in the context index, a link from the one or more document links associated with a particular word in the context index, the link providing a reference to an entry in the attribute index, the entry in the attribute index indicating a particular document that includes the particular word and including access control information for the particular document;
    searching, using a search query, a content index to determine a first search results set, the first search result set comprising a first set of data objects from the one or more data objects;
    searching, using access data associated with the search query, an attribute index to determine a second search result set, the second search result set comprising a second set of data objects from the one or more data objects; and
    obtaining a search result based on the first search result set and the second search result set.

12. The computer program product of claim 11, wherein the search result comprises pointers to one or more data objects from the first and/or second set of data objects.

13. The computer program product of claim 11, wherein the obtaining of the search result comprises merging the first search result set and the second search result set.

14. The computer program product of claim 13, wherein the merging of the first search result set and the second search result set comprises identifying data objects having a predetermined relationship to the first search result set and to the second search result set.

15. The computer program product of claim 13, wherein the merging of the first search result set and the second search result set comprises performing a logical AND operation on the first search result set and the second search result set to produce a resultant set.

16. The computer program product of claim 15, further comprising merging the resultant set with an additional search result set.

17. The computer program product of claim 16, wherein merging the resultant set with the additional search result set comprising performing a logical OR operation on the resultant set and the additional search result set.

18. The computer program product of claim 16, wherein the obtaining of the additional search result set comprises searching the attribute index for data objects that have access control attributes that correspond to the user access data and that have metadata that corresponds to the content associated with the search query.

19. The computer program product of claim 11, wherein the access control attributes comprise user access right information.

20. A system comprising:
memory that stores executable instructions; and
a processing device that executes the executable instructions to:
generate an attribute index for one or more data objects, the attribute index comprising entries associated with respective access control information for each of the one or more data objects;
generate a content index for the one or more data objects, the content index comprising words from the one or more data objects and one or more document links associated with respective words in the context index, a link from the one or more document links associated with a particular word in the context index, the link providing a reference to an entry in the attribute index, the entry in the attribute index indicating a particular document that includes the particular word and including access control information for the particular document;
search, using a search query, a content index to determine a first search results set, the first search result set comprising a first set of data objects from the one or more data objects;
search, using access data associated with the search query, an attribute index to determine a second search result set, the second search result set comprising a second set o data objects from the one or more data objects; and
obtain a search result based on the first search result set and the second search result set.

* * * * *